Patented Oct. 22, 1940

2,218,920

UNITED STATES PATENT OFFICE 2,218,920

WATER-INSOLUBLE AZO DYESTUFFS

Heinrich Morschel, Leverkusen-Wiesdorf, and Rudolf Ritter Wolff, Leverkusen-Kuppersteg, Germany, assignors to General Aniline & Film Corporation, a corporation of Delaware No Drawing. Application June 29, 1938, Serial No. 216,486. In Germany July 6, 1937

10 Claims. (Cl. 260—204)

The present invention relates to new water-insoluble azo dyestuffs, to a process of preparing the same and to fibers dyed with the said dyestuffs; more particularly it relates to azo dyestuffs of the general formula:

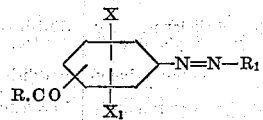

In this formula R stands for alkyl, aryl, aralkyl or hydroaryl, $R_1$ stands for the radical of an arylamide of an aromatic orthohydroxycarboxylic acid, R and $R_1$ being free from watersolubilizing groups, X and $X_1$ stand for alkyl or alkoxy groups and the residue R.CO— is attached to one of the positions 3 or 4 with respect to the azo bridge. R in the above general formula may be substituted e. g. by halogen, hydroxyl, alkoxy, alkyl.

Our new dyestuffs are obtainable by coupling the diazo compound of an amine of the general formula:

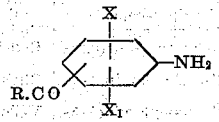

wherein R, X and $X_1$ mean the same as stated above, with an aryl-amide of an aromatic orthohydroxycarboxylic acid, whereby the components are selected in such a manner that they are free from watersolubilizing groups. The new dyestuffs may be produced either in substance or on the fiber.

The new products are, as far as they are prepared in substance, valuable pigment dyestuffs; as far as the manufacture took place on the fiber, the dyeings are distinguished by their excellent fastness properties. Thus they are superior to the comparable known dyestuffs in their fastness to peroxide; the new dyestuffs having two alkoxy groups in the diazo component are especially valuable in this respect. For the manufacture on the fiber textiles of natural or regenerated cellulose as well as those of animal fibers can be taken. For the manufacture of the dyestuffs various processes may be used, for example, the usual icecolour-process; of course, the diazo compounds mentioned can also be used in stabilised form, for instance, as nitrosamine- or diazoamino-compounds.

The diazo components used in the above described process are obtainable e. g. by nitrating the correspondingly substituted ketones and reducing the nitro-compounds thus obtained, or by introducing the carboxylic acid radical into suitably substituted anilines according to the Friedel-Craft reaction.

Dialkoxy acylbenzenes are known, for instance, from "Beilstein, Handbuch der organischen Chemie", 4th ed., Vol. VIII, pages 267–272 and 312–313, and Vol. VIII, first supplement, page 321. Into these compounds, an amino group is introduced, as stated above, by nitrating and then reducing the nitro compound formed in the usual manner. The aminodialkoxy-benzenes employed in the second method stated for preparing the diazo components are, likewise, known from "Beilstein, Handbuch der organischen Chemie", 4th ed., Vol. XIII, pages 780–785. These compounds are first converted into the acetamino compounds (Beilstein, 1 c.) to protect the amino group and then acted upon with aluminium chloride in the usual manner. An analogous process, in which disubstituted anilines are converted into ketones, is described in U. S. Patent 2,078,538.

The following examples illustrate the invention without limiting it thereto.

Example 1

Well scoured, dried cottonware piece goods are slop-padded on a foulard with a solution, which contains per liter 15 gs of 1-(2'-hydroxynaphthalene-3'-carboylamino)-2-methoxy-4-chlorobenzene, 22.5 cc. of sodium hydroxide solution, 34° Bé. and 22.5 cc. of Turkey-red oil. The impregnated and dried material is then passed through a developing-solution which contains the diazo compound prepared from 13 gs. of 2.4-dimethoxy-5-aminoacetophenone per liter and is weakly acetic. After a short passage through air the material is rinsed several times with cold water and finally soaped, rinsed and dried in the usual manner.

A bluish-Bordeaux shade of very good fastness to peroxide is obtained.

Example 2

Well scoured, dried cotton yarn is impregnated with a solution of 4 gs. 1-(2'-hydroxynaphthalene-3'-carboylamino)-naphthalene, 10 cc. of sodium hydroxide solution 34° Bé. and 10 cc. of Turkey-red oil 50% per liter, squeezed well and developed with a weakly acetic developing-solution, which contains 3 gs. of 3-amino-2.5-dimethoxybenzophenone as diazo compound per liter (obtained by nitrating and reducing 2.5-dimethoxybenzophenone), rinsed and soaped.

A Bordeaux shade of very good fastness properties is obtained.

For the sake of simplicity the further combinations are arranged in the following table:

| Diazo component | Azo-component | Shade |
| --- | --- | --- |
| 2,4-dimethoxy-5-amino-acetophenone | 1-methyl-2-(2'-hydroxy-naphthalene-3'-carboylamino)-5-methoxybenzene. | Bordeaux. |
| Do | 1-methoxy-2-(2'-hydroxy-naphthalene-3'-carboylamino)-4-chlorobenzene. | Do. |
| Do | 1, 3-dimethoxy-4-(2'-hydroxynaphthalene-3'-carboylamino)-6-chlorobenzene. | Do. |
| 2, 4-dimethoxy-5-amino-benzophenone | 1, 4-dimethoxy-2-(2'-hydroxynaphthalene-3'-carboylamino)-5-chlorobenzene. | Do. |
| Do | 1-(2'-hydroxynaphthalene-3'-carboylamino)-naphthalene. | Somewhat bluish Bordeaux. |
| 2, 4-dimethoxy-5-amino-propriophenone | 1-methoxy-2-(2'-hydroxynaphthalene-3'-carboylamino)-benzene. | Bluish Bordeaux. |
| Do | 1-methyl-2-(2'-hydroxynaphthalene-3'-carboylamino)-benzene. | Reddish violet. |
| Do | 1-methyl-2-methoxy-5-(2'-hydroxynaphthalene-3'-carboylamino) benzene. | Bluish Bordeaux. |
| 2, 4-dimethoxy-5-amino-hexahydro-benzophenone. | 1-methyl-2-(2'-hydroxynaphthalene-3'-carboylamino)-5-methoxybenzene. | Red Bordeaux. |
| 2, 4-diethoxy-5-amino-acetophenone | 1, 4-dimethoxy-2-(2'-hydroxynaphthalene-3'-carboylamino)-benzene. | Reddish Bordeaux. |
| Do | 1-(2'-hydroxynaphthalene-3'-carboylamino)-naphthalene. | Bluish Bordeaux. |
| Do | 1, 3-dimethoxy-4-(2'-hydroxynaphthalene-3'-carboylamino)-6-chlorobenzene. | Do. |
| Do | 1-(1', 2'-benzocarbazole-5''-hydroxy-4'''-carboylamino)-4-methoxybenzene. | Reddish blue-black. |
| 2, 4-diethoxy-5-amino-propriophenone | 1, 3-dimethoxy-4-(2'-hydroxy-naphthalene-3'-carboylamino)-6-chlorobenzene. | Bordeaux. |
| 2, 4-diethoxy-5-aminobenzophenone | 1-(2'-hydroxynaphthalene-3'-carboylamino)-3-nitrobenzene. | Strongly bluish Bordeaux. |
| 3-amino-2, 5-dimethoxy-acetophenone | 1-methyl-2-(1', 2'-benzocarbazole-5''-hydroxy-4'''-carboylamino)-5-methoxybenzene. | Bluish black. |
| Do | 1, 3-dimethoxy-4-(2'-hydroxynaphthalene-3'-carboylamino)-6-chlorobenzene. | Reddish violet. |
| 3-amino-2,5-dimethoxy-benzophenone | 1,4-dimethoxy-2-(2'-hydroxynaphthalene-3'-carboylamino)-5-chlorobenzene. | Bordeaux. |
| Do | 1-methyl-2-(1',2'-benzocarbazole-5''-hydroxy-4'''-carboylamino)-5-methoxy-benzene. | Dark blue. |
| 3-amino-2,5-diethoxybenzophenone | 1,3-dimethoxy-4-(2'-hydroxynaphthalene-3'-carboylamino)-6-chlorobenzene. | Bluish Bordeaux. |
| Do | 1,4-dimethoxy-2-(2'-hydroxynaphthalene-3'-carboylamino)-5-chlorobenzene. | Reddish Bordeaux. |
| 4-amino-2,5-dimethoxyacetophenone | 1,3-dimethoxy-4-(2'-hydroxynaphthalene-3'-carboylamino)-6-chlorobenzene. | Currant. |
| 4-amino-2,5-dimethoxypropriophenone | 1-methoxy-2-(2'-hydroxynaphthalene-3'-carboylamino)-4-chlorobenzene. | Strongly bluish Bordeaux. |
| Do | 1-methyl-4-(2'hydroxynaphthalene-3'-carboylamino)-benzene. | Do. |
| 4-amino-2,5-dimethoxyhexahydrobenzophenone. | 1-(2'-hydroxynaphthalene-3'-carboylamino)-3-nitrobenzene. | Strongly bluish Bordeaux. |
| 2-methoxy-4-amino-5-methyl-acetophenone | 1-methyl-4-(2'-hydroxynaphthalene-3'-carboylamino)-benzene. | Bluish red. |
| Do | 1-(2'-hydroxynaphthalene-3'-carboylamino)-4-chlorobenzene. | Yellowish red. |
| Do | 1-methyl-2-(2'-hydroxynaphthalene-3'-carboylamino)-5-chlorobenzene. | Red-Bordeaux. |
| 2,4-dimethyl-5-aminoacetophenone | 1,3-dimethoxy-4-(2'-hydroxynaphthalene-3'-carboylamino)-6-chlorobenzene. | Bluish red. |
| Do | 1,4-dimethoxy-2-(2'-hydroxynaphthalene-3'-carboylamino)-5-chlorobenzene. | Yellowish red. |
| 2, 4-dimethyl-5-amino-benzophenone | 1-methyl-2-(2'hydroxy-naphthalene-3'-carboylamino)-5-chlorobenzene. | Red. |
| Do | 1-methoxy-2-(2'-hydroxy-naphthalene-3'-carboylamino)-5-chlorobenzene. | Strongly yellowish red. |
| 4-amino-2,5-dimethyl-acetophenone | 1, 4-dimethoxy-2-(2'-hydroxynaphthalene-3'-carboylamino)-benzene. | Bluish red. |
| Do | 2-(2'-hydroxynaphthalene-3'-carboylamino)-naphthalene. | Red. |
| 2-methoxy-4-methyl-5-aminobenzophenone | 2-hydroxynaphthalene-3-carboylaminobenzene. | Red-Bordeaux. |
| 2.4-dimethoxy-5-amino-phenylacetophenone | 1-methyl-2-(2'-hydroxy-naphthalene-3'-carboylamino)-benzene. | Bluish garnet. |
| Do | 1-methyl-2-(2'-hydroxynaphthalene-3'-carboylamino)-5-chlorobenzene. | Strongly bluish garnet. |
| Do | 1-(2'hydroxynaphthalene-3'-carboylamino)-naphthalene. | Do. |

We claim:

1. As new products, water-insoluble azo dyestuffs of the general formula:

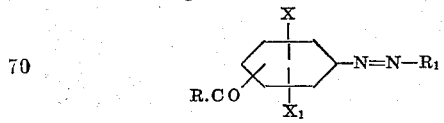

wherein R stands for a radical of the group consisting of alkyl, aryl, aralkyl and hydroaryl, R₁ stands for the radical of an arylamide of an aromatic ortho-hydroxy-carboxylic acid derived from a member of the group consisting of naphthalene and carbazole, R and R₁ being free from water-solubilizing groups, X and X₁ stand for radicals of the group consisting of alkyl and alkoxy, and the residue R.CO— is attached to one of the positions 3 and 4 with respect to the azo bridge, yielding when produced on the fiber various shades of good fastness properties.

2. As new products, watersoluble azo dyestuffs of the general formula:

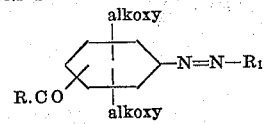

wherein R stands for a radical of the group consisting of alkyl, aryl, aralkyl and hydroaryl, R₁ stands for the radical of an arylamide of an aromatic ortho-hydroxy-carboxylic acid derived from a member of the group consisting of naphthalene and carbazole, R and R₁ being free from watersolubilizing groups, and the residue R.CO— is attached to one of the positions 3 and 4 with respect to the azo bridge, yielding when produced on the fiber various shades of good fastness properties.

3. As new products, water-insoluble azo dyestuffs of the general formula:

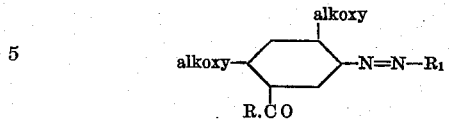

wherein R stands for a radical of the group consisting of alkyl, aryl, aralkyl and hydroaryl, $R_1$ stands for the radical of an arylamide of an aromatic ortho-hydroxy-carboxylic acid derived from a member of the group consisting of naphthalene and carbazole, R and $R_1$ being free from watersolubilizing groups, yielding when produced on the fiber various shades of good fastness properties.

4. As a new product the water-insoluble azo dyestuff of the formula

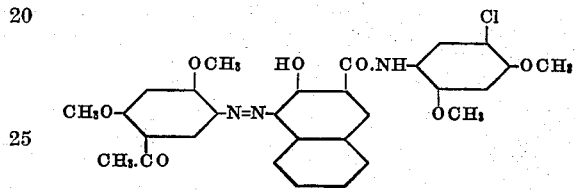

yielding when produced on the fiber Bordeaux shades of good fastness properties.

5. As a new product the water-insoluble azo dyestuff of the formula:

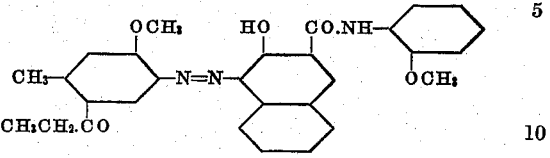

yielding when produced on the fiber bluish Bordeaux shades of good fastness properties.

6. Fibers dyed with a dyestuff as claimed in claim 1.
7. Fibers dyed with a dyestuff as claimed in claim 2.
8. Fibers dyed with a dyestuff as claimed in claim 3.
9. Fibers dyed with a dyestuff as claimed in claim 4.
10. Fibers dyed with a dyestuff as claimed in claim 5.

HEINRICH MORSCHEL.
RUDOLF RITTER WOLFF.